April 29, 1941.  A. A. LOCKE  2,240,338
METHOD AND APPARATUS FOR COOKING SUBSTANCES
Filed March 1, 1940  3 Sheets-Sheet 3
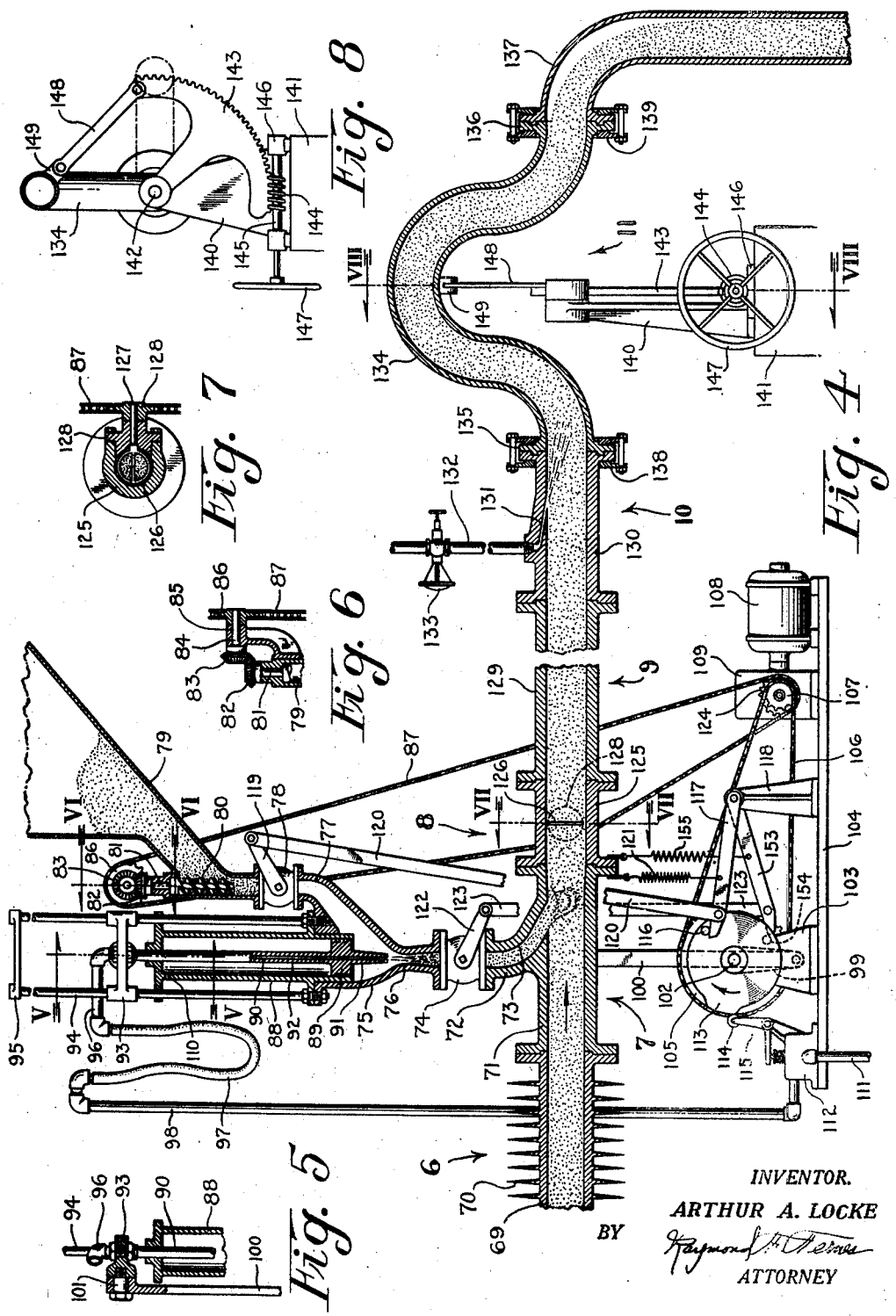
INVENTOR.
ARTHUR A. LOCKE
BY
ATTORNEY Patented Apr. 29, 1941

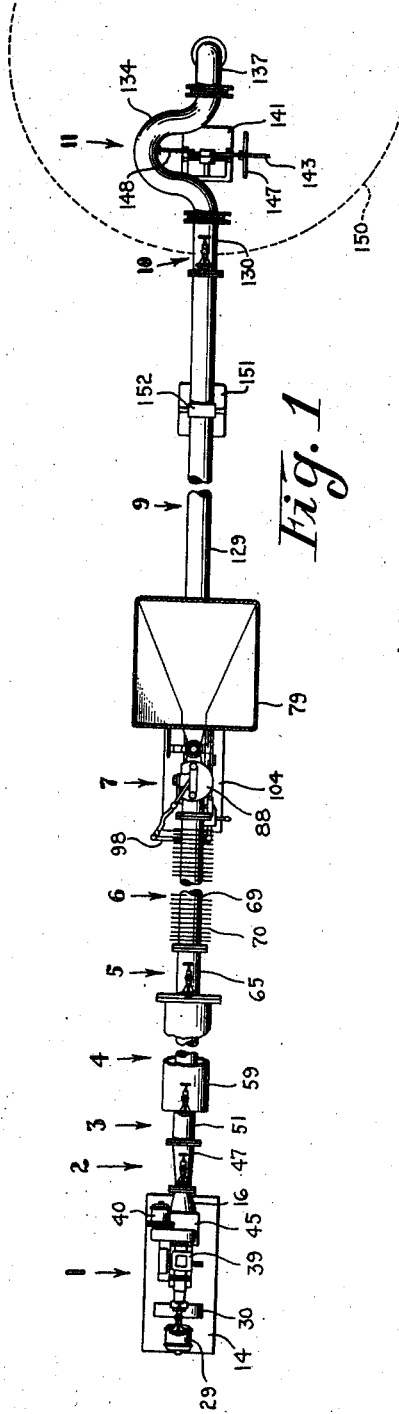

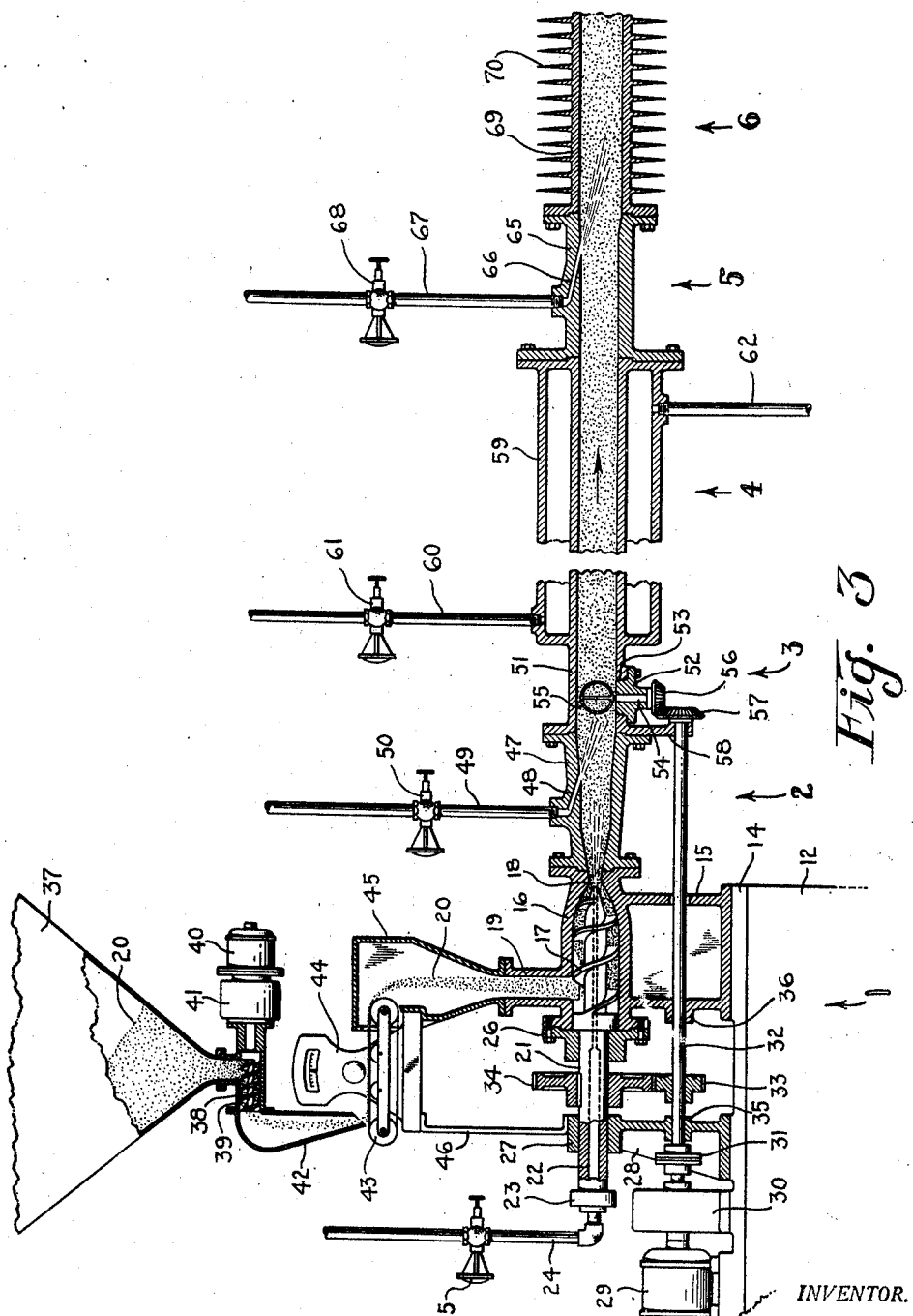

2,240,338

UNITED STATES PATENT OFFICE 2,240,338

METHOD AND APPARATUS FOR COOKING SUBSTANCES

Arthur A. Locke, Detroit, Mich.

Application March 1, 1940, Serial No. 321,633

18 Claims. (Cl. 53—18)

This invention relates to a method and apparatus for cooking substances for food or beverage purposes, or for the manufacture of commercial preparations which require cooking. In particular, the invention relates to a continuous cooking device into which materials are fed in measured quantities in combination with progressive increases in the general cross sectional dimensions of the cooking device.

In the past, cooking devices have been constructed in which relatively granular edible substances are moved in a continuous path during the cooking cycle. However, in such cases it has been customary to suspend the granular substances in a liquid carrier and, after the cooking operation, to separate the granular substances from the liquid medium. In accordance with the practice of my invention, I contemplate the continuous cooking and processing of a finished preparation. For example, I may prepare finished products such as jellies, catchup, applesauce, marmalades, cranberry sauce, etc. The apparatus may also be used in the manufacture of non-edible products such as paste, soaps, etc. Still further, the apparatus may be used in independent operations as a separate step in the processing of finished products. An example of such a step is the preparation of mash used in the manufacture of alcoholic beverages.

The present invention, in general, comprises an apparatus in the form of a tubular container open at its outlet end and having a plurality of feeding devices adaptable for injecting predetermined quantities of substances into the tubular container and in which the container progressively increases in cross sectional area in the direction of its outlet end in an amount sufficient to accommodate substantially the quantities of material injected into the container without materially varying the constant rate of flow of the mass within the container. Thus materials may be injected directly into the container and the pressure of injection being sufficient to cause the material within the container to move along in a mass in the direction of the open end of the container.

During the continuous movement of mixed materials along the tubular container I contemplate various zones within which the material may be treated. For example, the material in one or more zones may be subjected to elevated temperatures for the purpose of cooking. I also contemplate cooling zones, and zones within which the material may be maintained at definite temperatures. Because of the construction of the tubular container, it may be formed in any desired length, thus in combination with the rate of movement of the material within the container it is possible to control accurately the time cycle during which the material is subjected to treatment within its respective zone. Besides various methods of controlling the pressure and rate at which materials are injected into the container, I also provide means forming part of the container which may be elevated in order to obtain a more efficient control of the pressure of the material within the container.

It is, therefore, among the objects of my invention, to provide a cooking device which operates continuously; to provide a cooking device which permits uniform treatment of product; to provide a cooking device which is automatic in operation, and to provide a cooking device which in comparison with conventional methods of treating products is more economical in original investment and in maintenance.

These and other objects and advantages will appear more fully in the following detailed description when considered in connection with the accompanying drawings, in which:

Fig. 1 is a plan view illustrating a complete embodiment of my invention;

Fig. 2 is a side elevational view thereof;

Fig. 3 is an enlarged elevational view partly in section of a portion of the apparatus shown in Figure 2;

Fig. 4 is an enlarged elevational view in section of the remaining portion of the apparatus shown in Figure 2;

Fig. 5 is a detailed view, in section, of the upper portion of a cylinder mechanism taken along lines V—V of Figure 4;

Fig. 6 is a detailed view in section of a hopper screw drive taken along lines VI—VI of Figure 4;

Fig. 7 is a transverse view in section of a mixing device taken along lines VII—VII of Figure 4; and, Fig. 8 is a transverse view partly in section taken along lines VIII—VIII of Figure 4, and illustrating a mechanism for varying the elevation of a portion of the container.

While the invention as herein described is applicable to the preparation of various food products and to the preparation of non-edible products and without limiting the invention I describe herein the use of the apparatus as a step in the process of the manufacture of alcoholic beverages. More specifically the present illustrative example refers to a continuous mashing system. Conventional methods of mashing are accomplished by the batch system, that is, the materials to be cooked are placed in a closed container and subjected to elevated temperatures. After the cooking cycle, the materials are removed from the cooker and placed in a mash container wherein a definite temperature is maintained for a specific duration. Thereafter the mash is conveyed through cooling tubes and subsequently discharged into a fermenting tank.

With reference to the drawings and in particular to Figure 2, an embodiment of my invention is shown in the form of a continuous horizontal tubular container into which materials are injected at various zones and in which zones various temperatures are effected. As denoted by reference characters these zones may be divided into sections of which the character 1 represents a feeding device for injecting granular materials into the tubular container. The numeral 2 represents a hot water injecting zone. Mixing is effected in zone 3 and a cooking operation is performed in zone 4. Cooling water is introduced at 5 after which the material passes along a cooling zone 6. At 7 malt is injected into the container and mixed at zone 8. Thereafter the cooked and mixed material passes into zone 9 wherein the material is maintained at a definite temperature for a specific duration. At zone 10 an additional quantity of water is added in order to provide the material with a sufficient water content for fermentation, and also to bring the mixture to the correct temperature for fermentation. Zone 11 includes means for varying the pressure within the tubular container.

Referring to zone 1 as shown in Figure 2, and as shown in detail in Figure 3, I provide a unit mounted on a base 12 supported from a floor 13. A secondary base 14 functions to maintain the unit upon a horizontal surface. To the base 14 is attached through a bracket 15 a housing 16 within which is rotatably mounted a feed screw 17. This feed screw is designed with a decreasing pitch toward its extruding end to provide a more positive action for forcing the feeding material and for preventing any irregularity due to back pressure. The discharge end of the housing 16 includes a restricted passageway 18 through which material moved by the feed screw is ejected. Extending upward from the housing 16 is a flanged member 19 having an aperture which communicates with the interior of the housing 16. Through this member, material, such as ground corn 20, is fed continuously. The feed screw 17 is provided with a shaft 21 having an aperture 22 formed therethrough. Through a universal connection 23 the aperture 22 communicates with a conduit 24 which, for example, feeds 12.6 lbs. of water per minute at a temperature of 312° F. A reducing valve 25 controls the flow of hot water or steam. The feed screw end of the shaft 21 therefore operates as a nozzle to assist in forcing the ground corn through the restricting passageway 18 and at the same time causes an intermixture of steam or hot water with the granular material.

The feed screw 17 is retained in the housing 16 by an end bearing 26 while the opposite end of the shaft 21 is supported by a bearing 27 forming part of a bracket 28. The feed screw 17 is driven continuously from a motor 29 through a reduction unit 30, universal joint 31 and shaft 32. A pinion 33 attached to the shaft 32, and a gear 34 keyed to the shaft 21 completes the drive from the motor to the feed screw. The shaft 32 is supported by bearings 35 and 36 forming part of the brackets 28 and 15, respectively.

A hopper 37 is provided for retaining a supply of granular material such as corn 20. From the hopper the granular material flows to a feed screw 38 rotatably mounted in a housing 39. A motor 40 through a reduction unit 41 drives the feed screw 38 continuously. A funnel member 42 attached to the housing 39 forms an enclosure through which the granular material drops onto a continuously operating conveyor 43 forming part of a conventional continuously weighing scale 44. From the scale conveyor the granular material is conveyed into an enclosure 45 which communicates with the flange member 19 extending from the feed screw housing 16. An upright member 46 attached to the bearing 27 supports one end of the scale 44, the other end of the scale being supported by the enclosure member 45. Through this arrangement the continuous flow of granular material is moved toward the feed screw 17. In the present example this flow of ground corn moves at the rate of approximately 33.6 lbs. per minute.

At zone 2 the mixed granular material and water begin their travel through the various zones which form in combination a continuous tubular container. A tubular and flanged section 47 connects in axial alignment with the housing 16 and forms a continuation thereof. The internal aperture of this member increases in diameter in the direction of flow of material therethrough in order to compensate substantially for the increased volume of materials injected therein and allowing for the movement of materials at a predetermined velocity. An aperture 48 extending through the wall of the member 47 and at an angle which permits a discharge therefrom in the general direction of the flow of materials in the container communicates with a conduit 49. A reducing valve 50 associated with the conduit 49 permits control of hot water or steam at this point. Similar to the first named water injecting means the present injecting unit functions to introduce 12.6 lbs. of water at 280° F.

Unit 3 incorporates a mixing device which in combination with unit 4 comprises a tubular and flanged member 51 secured to and aligned with the preceding sectional member 47. A bearing member 52 forms a plug which engages a complementary aperture 53 in the under side of the tubular member 51. The bearing member 52 supports a shaft 54 to which is attached a ring-like member 55 lying within the horizontal opening of the tubular member 51. A bevel gear 56 is attached to the opposite end of the shaft 54 and meshes with a bevel gear 57 keyed to the shaft 32. A bracket 58 extending from the flanged end of the tubular member 51 operates as a bearing for supporting the gear end of the shaft 32. As the granular material and water move through the tubular container the mass passes by the ring 55 which rotates rapidly resulting in an intimate mixture of the water and granular material.

At zone 4 the mass of material, as it passes through the tubular member 51, is subjected to a continued heating operation which cooks the material as it moves through the tubular member. This cooking device comprises a jacket 59 formed around the tubular member 51 and into which is circulated steam under pressure. A conduit 60 and reducing valve 61 provide means through which steam is fed to the interior of the jacket 59. The steam circulates through the jacket and through a conduit 62, steam trap 63 (Fig. 1) and drain 64. In combination with the movement of the mass within the tubular member the length of the steam jacket is determined in accordance with the desired time cycle of the cooking operation.

At zone 5, and by way of example, cooling water at 40° F. is introduced at the rate of 50.4 lbs. per minute. This unit comprises a tubular and flanged member 65 (Fig. 3) secured in axial alignment with the tubular member 51. An aperture 66 through the wall of the member 65 and inclined in a direction to permit a discharge in the general direction of the moving mass communicates with a conduit 67 and reducing valve 68. The internal aperture of the tubular member 65 increases in the direction of movement of the mass within the container in a proportion substantially equal to the volume of water injected at this zone without disturbing the rate of movement of the mass within the container.

Unit 6 provides a zone which functions to reduce the temperature of the mass and comprises essentially a tubular and flanged member 69 secured in axial alignment with the preceding tubular member 65. The tubular member 69 may be cooled by a cold water jacket or by air cooling fins 70 as shown.

The mass of granular material and water as it moves through the mixing and cooking zones assumes the consistency of a gelatinous material of a viscosity sufficiently heavy to require the continuous movement of the mass to move along the tubular container due to displacement resulting from the additional materials being injected into the container. The frictional engagement of the mass with the walls of the container facilitates continual mixing of the ingredients. As the gelatinous mass moves from the cooling zone 6 it enters zone 7 whereat additional materials are injected into the container.

Zone 7 provides means for injecting material such as malt in the form of a solid granular substance and water into commingling relationship with the gelatinous mass. This unit 7 may introduce additional granular material into the container by feed screw mechanism substantially similar to that described in connection with unit 1. However, for purpose of modification I show a method of introducing the granular material into the container by means of a reciprocating valve mechanism operating in conjunction with a reciprocating piston and water injecting means. It is also to be understood that this mechanism for injecting the granular material may be utilized in the initial injecting operation to replace by way of modification the feed screw injecting mechanism described in unit 1.

The injecting mechanism 7, as shown in particular in Figure 4, includes a tubular and flanged member 71 positioned in axial alignment with the tubular cooling member 69. A connecting tubular member 72 forming part of the tubular member 71 is provided with an aperture 73 which communicates with the interior of the tubular member 71 and which is inclined in a direction to permit a discharge therefrom in the general direction of the movement of the mass within the tubular container. Associated with the tubular member 72 is a quick operating full passage opening conventional lubricated valve 74. To this valve is attached a housing 75 having an opening including a restricted passageway 76. Branched from the housing 75 is a duct 77 which engages a conventional lubricated valve 78, similar to the valve 74. This valve controls the amount of malt, or other material, which is introduced into the housing 75.

A hopper 79 containing malt in granular form communicates with the valve 78. A feed screw 80 retained within a portion of the housing of the hopper 79 and positioned in axial alignment with the valve 78 rotates continuously and functions to assist in the positive movement of granular material in the direction of the valve 78. Although the valve 78 is periodically closed, the feed screw 80 which rotates continuously is so positioned for slippage that it will not cause a wedging action of the granular material against the closed valve 78. A shaft 81 associated with the feed screw 80 connects with a mitre gear 82, which in turn meshes with a corresponding mitre gear 83 mounted on a shaft 84 (Fig. 6) supported by a bracket 85. A sprocket 86 keyed to the shaft 84 engages a chain 87 which connects with a drive source hereinafter described.

Associated with the housing 75 and in axial alignment with the valve 74 is a cylinder 88 having a piston 89 and a piston rod 90. A nozzle 91 having an aperture 92 forms an extension of the piston 89 and its terminating end lies in close proximity to the restricted opening 76 of the housing 75. The upper portion of the piston rod 90 connects with a bracket 93 mounted in slidable relationship with guide rods 94 affixed to the cylinder 88. A connecting bracket 95 joins the upper portion of the guide rods together. A conduit 96 connected with the top end of the piston rod 90 forms a continuation of the aperture 92 within the piston rod 90. A flexible hose 97 connected with the conduit 96 and connected with a conduit 98 permits a permanent but flexible connection with the stationary conduit 98 to the vertically reciprocating piston rod 90.

The piston 89 is reciprocated by means of a crank arm 99 which joins the piston rod 90 through the bracket 93 and a connecting link 100. As shown in Figure 5, the connecting link 100 pivotally joins the bracket 93 through a pivot pin 101. The crank arm 99 (Fig. 4) is keyed to a shaft 102 supported by a bracket 103 mounted on a base 104. A sprocket 105 also keyed to the shaft 102 meshes with a chain 106 engaging with a sprocket 107. A motor 108 and reduction unit 109 mounted on the base 104 supports the sprocket 107 and causes continual rotation of the crank arm 99 during operation of the cooking apparatus. As the crank arm 99 rotates it causes the piston 89 to reciprocate, and in a downward movement of the piston a pressure is built up within the housing 75 which assists in the movement of the malt or granular material through the valve 74 and into commingling relationship with the mass within the tubular container. An aperture 110 through the wall of the upper part of the cylinder 88 prevents back pressure within the cylinder 88.

Also, for the purpose of assisting in the injection of malt within the container, means are provided in the form of a measured quantity of hot water emitted from the nozzle 91. The hot water originating from a source of supply and through a conduit 111 reaches the conventional valve 112 from which the water enters the conduit 98 leading to the aperture 92 within the piston rod 90. The water is ejected from the nozzle at the lowermost cycle of the piston 89 and is timed by means of a cam 113 keyed to the shaft 102. This cam cooperates with a cam follower 114 associated with a pivoted lever 115 adaptable for opening or closing the valve 112. The temperature of the water utilized in this operation is approximately 150° F. and the cam 113 is so arranged in relation with the cam speed so as to eject the required quantity of water from the nozzle 91, or for example 8.4 pounds of water per minute.

Attached to the cam 113 is a cam pin 116 which engages a lever 117 pivotally attached to a bracket 118 mounted on the base 104. Valve 78 is provided with an operating arm 119, and link 120 which connects the arm 119 with the lever 117. As the cam 113 rotates the pin 116 engages the lever 117 to open the valve 78. A spring 121 attached to the lever 117 functions to actuate and close the valve 78 when the cam pin 116 disengages the lever 117. The size and duration of opening of the valve 78 permits a measured quantity of malt to pass into the housing 75. In the present example this quantity is in the order of 2.23 pounds per minute. This material is fed through the valve 78 and lies within the housing 75 in the region of the restricted opening 76. Thus during the upward movement of the piston 89 the valve 78 is opened and the measured quantity of material is fed into the housing 75, while in the downward movement of the piston the valve 78 is closed allowing pressure to be built up within the housing, which in combination with hot water ejected from the nozzle moves the malt and water through the valve 74, as soon as it is opened.

Actuation of the valve 74 is effected in substantially the same manner as the actuation of valve 78. An operating arm 122 associated with the valve 74 connects with a link 123 pivoted to a lever 153. This lever is also pivoted to the bracket 118 and is engageable with a cam pin 154 projecting from the opposite face of the cam 113. By this arrangement the valve 74 is opened as the piston 89 nears the end of its downward stroke, and the valve closes at about the time the piston begins its upward stroke. A spring 155 attached to the lever 153 maintains the valve 74 in its normal closed position.

This cycle of operation functions continuously and in effect provides a substantially continuous flow of malt and water into commingling relationship with the mass within the tubular container. The chain 87 associated with the sprocket 86 which drives the feed screw 80 meshes with a sprocket 124 associated with the reduction unit 109. Shortly after the malt and water are brought into contact with the gelatinous mass the materials are again subjected to a mixing operation as indicated by unit 8 which embodies a short tubular member 125 having flanges and which is secured in axial alignment with the tubular member 71. It is to be noted that the tubular member 71 increases slightly in diameter in order to accommodate the additional materials injected therein without increasing the speed of movement of the principal mass. The mixing device is substantially similar to that described in connection with unit 3 and consists essentially of a ring-like member 126 (Fig. 7) located within the tubular member 125 and attached to a shaft 127 mounted in a plug member 128 secured to the tubular member 125. A sprocket 128 keyed to the shaft 127 is driven from the chain 87 which provides a drive for the hopper feed screw 80.

From the mixing zone 8 the mass of material passes into a conversion zone 9 which delays or stores the material for a predetermined period at a temperature of approximately 150° F. Essentially zone 9 comprises a continuation of the tubular container in the form of a tubular and flanged member 129 concentrically aligned with the tubular member of zone 8.

In the next operation by way of example and as indicated by zone 10, cooling water at 40° F. is introduced into the container for the purpose of reducing the temperature of the mass and for the purpose of adding a sufficient amount of water to provide the mass with the proper consistency and temperature in accordance with the requirement of the finished product as supplied by the apparatus and process herein described. In the present example the amount of water injected into the container at this zone is approximately 142.8 lbs. per minute. At this water injecting zone the unit comprises a flanged tubular member 130 in axial alignment with the tubular member 129 and provided with an aperture 131 extending through the wall of the tubular member 130, which aperture communicates with a conduit 132 and reducing valve 133. The aperture 131 is inclined at an angle to permit injection of water therefrom in the general direction of the movement of the mass within the container.

In order to permit the water introduced at zone 10 to become adequately mixed with the mass within the container and in order to provide means near the outlet end of the container for controlling to some extent the pressure of the mass within the container, I provide a U-shaped member which is adjustable and which may be controlled to change the path of the container from a horizontal position to a position which is partially vertical. Such an arrangement is illustrated by the unit 11 comprising a U-shaped tubular member 134 having end flanges 135 and 136 which lie at right angles to the general horizontal path of the tubular container. The flange 135 is adaptable for pivotal engagement with a flange forming part of the tubular member 130, and the flange 136 is adaptable for pivotal engagement with a flange forming part of a tubular member 137 which is the final passageway container for conducting the mass of treated material. Clamping means 138 and 139 function to retain the flanges 135 and 136 respectively in sliding or pivotal engagement with their complementary associated flanges.

Means are provided for raising the elevation of the tubular member 134 to suit the conditions for proper operation of the movement of the mass of material within the container. Figure 4 illustrates the tubular member 134 in an elevated position, whereas in Figure 2 the tubular member is shown in its horizontal position. Figure 8 illustrates in detail the mechanism for moving the tubular member 134 in proper position and for retaining it in that position. In general, the mechanism comprises a bracket 140 mounted on a support 141 and supports a pivot 142 which lies in axial alignment with the horizontal center of the principal tubular container. Attached to the pivot 142 is a worm wheel segment 143 which meshes with a worm gear 144 forming part of a shaft 145 supported by bearings 146 attached to the support 141. A hand wheel 147 keyed to the shaft 145 permits manual rotation of the worm gear 144 for moving the segment 143. A connecting link 148 joins one end of the segment 143 and is attached to the tubular U-shaped member 134 through a lug 149. By this arrangement the elevation of the tubular member 134 may be varied as desired by the manually operated hand wheel 147.

As shown in Figure 2 the terminating tubular member 137 may connect to a tank 150 into which the mass of material may be stored and from which the material may be dispensed. At one or more locations along the length of the tubular container a support may be provided in the form of a bracket 151 which associated, for example, with the tubular conduit 129 by means of a clamping band 152.

From the foregoing description it is believed apparent that I have provided a new and unique method and apparatus for treating materials, and while I have described the apparatus in connection with a specific application it may be readily understood that in certain cases it will be necessary to vary the treatment and to omit or interchange the zone of operation in accordance with the particular preparation of a commodity. Also, the apparatus may be used in the partial preparation of a finished product, or it may be utilized in the completion of partially processed products.

While I have shown a present preferred embodiment of my invention, it is to be understood that it is susceptible of modifications and that it is intended to include those modifications which are obviously applicable and which appear within the scope of the appended claims.

Having thus described my invention what I claim is:

1. An apparatus for treating products comprising, a tubular container having inlet and outlet ends, the internal aperture of said container in the region of the inlet end having an increase in its cross sectional area in the direction of the outlet end, positive means for introducing predetermined quantities of solid material into the container, and means for introducing a uniform flow of liquid into the container.

2. An apparatus for treating products comprising, a tubular container, and a plurality of means spaced along the container for introducing solid and liquid materials into the container, the internal aperture of said container having an increase in its cross sectional area at the points of introduction substantially in proportion to the volume of material introduced into the container.

3. A system for continuously mixing materials comprising means forming a conduit for conveying the materials and means for injecting measured quantities of different materials into the conduit, the movement of the materials within the conduit being caused by the pressure of materials introduced.

4. A system for continuously mixing materials comprising means forming a conduit for conveying the materials, means for injecting measured quantities of different materials into the conduit, and means for mechanically mixing the materials during their passage through the conduit, the movement of the materials within the conduit being caused by the pressure of materials introduced.

5. A system for continuously mixing and treating materials comprising means forming a conduit, means for injecting measured quantities of different materials into the conduit, and means for heating the materials as they are moved through the conduit, the movement of the materials within the conduit being caused by the pressure of materials introduced.

6. A system for continuously mixing and treating materials comprising means forming a conduit, means for injecting measured quantities of different materials into the conduit, means for mechanically mixing the materials within the conduit, and means for heating the materials as they are moved through the conduit, the movement of the materials within the conduit being caused by the pressure of materials introduced.

7. A system for continuously mixing and treating materials comprising means forming a conduit, means for injecting measured quantities of different materials into the conduit and means for elevating at least a portion of the conduit for increasing the pressure within the conduit.

8. A system for continuously mixing and treating materials comprising means forming a conduit having inlet and outlet ends, the internal aperture of said container in the region of the inlet end having an increase in its cross sectional area in the direction of the outlet end and means for injecting measured quantities of different materials into the conduit, said injecting means comprising a feed screw for forcing substantially solid material into the conduit, and means for injecting liquid into the conduit at substantially the point of introduction of the solid material.

9. A system for continuously mixing and treating materials comprising means forming a conduit having inlet and outlet ends, the internal aperture of said container in the region of the inlet end having an increase in its cross sectional area in the direction of the outlet end and means for injecting materials into the conduit, said injecting means comprising a feed screw for forcing substantially solid material into the conduit, means for supplying measured quantities of solid material to the feed screw, and means for injecting liquid into the conduit at substantially the point of introduction of the solid material.

10. A system for continuously mixing and treating materials comprising means forming a conduit and means for injecting materials into the conduit, said injecting means comprising a housing, a valve interposed between the housing and the conduit, means for introducing a measured quantity of solid material into the housing, means for actuating the valve, and means for forcing the solid material from the housing and into the conduit, the movement of the materials within the conduit being caused by the pressure of materials introduced.

11. A system for continuously mixing and treating materials comprising means forming a conduit and means for injecting materials into the conduit, said injecting means comprising a housing, a valve interposed between the housing and the conduit, means for introducing a measured quantity of solid material into the housing, means for actuating the valve, and a reciprocating piston associated with the housing for raising the pressure within the housing and for forcing the solid material into the conduit, the movement of the materials within the conduit being caused by the pressure of materials introduced.

12. A system for continuously mixing and treating materials comprising means forming a conduit and means for injecting materials into the conduit, said injecting means comprising a housing, a valve interposed between the housing and the conduit, means for introducing a measured quantity of solid material into the housing, means for actuating the valve, and a reciprocating piston having an aperture axially therethrough associated with the housing for raising the pressure within the housing and for forcing the solid material into the conduit, and means for introducing fluid to the piston aperture during the pressure stroke of the piston.

13. A method of treating products of combined liquid and solid particles in a tubular container the internal aperture of which increases in cross sectional area in the direction of its outlet and comprising the steps of injecting solid and liquid materials in measured quantities into the container in a manner in which the volume of injected material is substantially proportional to the increase in cross section area of the container.

14. A method of treating products comprising the steps of injecting into a tubular container solid and liquid materials in measured quantities proportional to the finished product and causing movement of the mixed materials along the tubular container solely by displacement produced by the injected materials.

15. A method of preparing products of combined liquid and solid particles comprising the introduction into a conduit of measured quantities of the ingredients in relative proportion to the finished product, and moving the material along the conduit by the pressure of introduction of the materials.

16. A method of preparing products of combined liquid and solid particles comprising the introduction into a conduit of measured quantities of the ingredients in relative proportion to the finished product, moving the material along the conduit by the pressure of introduction of the materials, and heating the materials as they are moved through a portion of the conduit.

17. A method of preparing products of combined liquid and solid particles comprising the introduction into a conduit of measured quantities of the ingredients in relative proportion to the finished product, moving the material along the conduit by the pressure of introduction of the materials, heating the materials as they are moved through a portion of the conduit, and cooling the materials as they are moved through a subsequent portion of the conduit.

18. A method of preparing products of combined liquid and solid particles comprising the introduction into a conduit of measured quantities of the ingredients in relative proportion to the finished product, moving the material along the conduit by the pressure of introduction of the materials, heating the materials as they are moved through a portion of the conduit, cooling the materials as they are moved through a subsequent portion of the conduit, and mechanically mixing the materials within the conduit.

ARTHUR A. LOCKE.